United States Patent [19]

Imanishi et al.

[11] Patent Number: 5,054,889
[45] Date of Patent: Oct. 8, 1991

[54] LIQUID CRYSTAL DISPLAY HAVING AN ALIGNMENT LAYER IN THE FORM OF A POROUS ALUMINA LAYER

[75] Inventors: Masao Imanishi; Atsushi Ohtaka; Kunio Hiyama; Takanori Kawamura, all of Shizuoka, Japan

[73] Assignee: Yamaha Corp., Japan

[21] Appl. No.: 477,229

[22] Filed: Feb. 8, 1990

[30] Foreign Application Priority Data

Feb. 8, 1989 [JP] Japan .................................. 1-29255

[51] Int. Cl.$^5$ .............................................. G02F 1/13
[52] U.S. Cl. ........................................ 359/76; 359/75
[58] Field of Search ...................... 350/350 S, 340, 341

[56] References Cited

U.S. PATENT DOCUMENTS 4,883,344 11/1989 Okada et al. ..................... 350/341 X
4,917,472 4/1990 Margerum et al. ................. 350/340

*Primary Examiner*—Stanley D. Miller
*Assistant Examiner*—Huy K. Mai
*Attorney, Agent, or Firm*—Ostrolenk, Faber, Gerb & Soffen

[57] ABSTRACT

In construction of a liquid crystal display including an alignment film and generally used for video display panels such as television sets, the orientation wafer is given in the form of a porous alumina layer. Substantially vertical molecular orientation is resulted from penetration of liquid crystal molecules into pores in the alignment film. Optical application of rubbing process in production enables free adjustment of the value of pretilt angle. Good reproduction and stability is assured even in the case of large fields of vision.

6 Claims, 1 Drawing Sheet

LIQUID CRYSTAL DISPLAY HAVING AN ALIGNMENT LAYER IN THE FORM OF A POROUS ALUMINA LAYER

BACKGROUND OF THE INVENTION

The present invention relates to a liquid crystal display, and more particularly relates to improvement in molecular orientation of a liquid crystal display generally used for video display panels such as television sets.

A liquid crystal display is in general provided with a alignment film (alignment layer) for liquid crystal molecular orientation in a prescribed direction. Conventionally, such an alignment film is classified into two major types, i.e. an organic film prepared by the rubbing process and an evaporated film (thin film) prepared by the oblique evaporation.

In the case of the organic film, a film of polyimide, polyamide or polyvinyl alcohol is formed on a substrate via spinner process or print process and the organic film is rubbed. In the case of the evaporated film, an oxide, i.e. a silica oxide such as SiO and $SiO_2$ or an magnesium fluoride such as $MgF_2$, is deposited onto an inclined substrate.

A liquid crystal display containing the above-described organic alignment film can be easily produced and exhibit stable molecular orientation when used for the TN (twisted nematic) liquid crystal system. Despite the merit, the display is quite unsuited for molecular orientation of a large pretilt angle which is needed for memory type ferroelectric liquid crystal components and STN (super twisted nematic) type liquid crystal components.

A liquid crystal display containing th above-described evaporated film can exhibit molecular orientation of relatively large pretilt angle. Despite its merit, it is difficult to produce a uniform alignment film which is necessary for good reproduction and stability of orientation in the cause of large image surfaces. In addition, its production efficiency is rather low.

SUMMARY OF THE INVENTION

It is the object of the present invention to assure molecular orientation of a large pretilt angle with good reproduction and stability even in the case of large display.

In accordance with the present invention, an alignment layer (alignment film) is given in the form of a porous alumina ($Al_2O_3$) layer.

DESCRIPTION OF THE PREFERRED EMBODIMENTS

As stated above, the alignment layer (alignment film) in accordance with the present invention is given in the form of a porous alumina layer (porous alumina film). The thickness of the alumina layer should preferably in a range form 5 nm to 5 $\mu$m, more preferably from 10 nm to 500 nm. When the thickness of the alumina layer exceeds 5 $\mu$m, only low degree orientation and memory are expected in the case of the high inductive liquid crystal. Whereas no orientation of liquid crystal molecules is caused when the thickness falls short of 5nm.

The dimension, more particularly the diameter of the pores in the alumina layer is designed according to the kind of liquid crystal infused in the display and the required value of the pretilt angle. Generally, the diameter should be in a range from 10 to several ten (about 70) nm. Too large diameter of the pores would degrade molecular orientation. Whereas it is rather infeasible to form pores of a diameter smaller than 10 nm. When necessary, the alumina layer may be subjected to proper rubbing process.

In production of such a liquid crystal display, a transparent electrode is first formed on a substrate made of, for example, glass by spattering of In-Sn oxide or $SnO_2$. Next, an Al layer is formed on the transparent electrode via evaporation, spattering or molten salt plating. The Al layer thus prepared is subjected to anodic oxidization with acid or alkaline solution to form an alumina layer, an alignment film. In this process, preferably the anodic oxidation should span the entire thickness of the Al layer. The anodic oxidization is generally carried out at a voltage of 0.5 to 50 V, with a current of several to several ten A° and at a bath temperature of 5 to 35° C. more preferably 10 to 25° C. The diameter, the depth and the cell size of the pore can be controlled freely through adjustment of these process conditions.

When necessary, the alumina layer so obtained may further be subjected to proper rubbing process. In this case, the surface of the alumina layer is rubbed in a specified direction with a cloth of natural or synthetic fibers. The alignment film so prepared is incorporated into an liquid crystal display in a known manner.

The alignment film thus obtained is provided with numerous fine pores opening in its surface. A part of liquid crystal molecules infused into the display permeate into the fine pores and oriented substantially in the thickness direction, i.e. the vertical direction, of the alignment film. Such a vertical orientation is well suited for the DAP(ECB) system and the DSM system.

Application of the rubbing process orients liquid crystal molecules in a direction parallel to the substrate, i.e. in the horizontal direction, thereby adjusting the pretilt angle. This alignment film is much suited for the TN system (relatively low pretilt angles), the STN system (relatively high pretilt angles) and the ferroelectric liquid crystal system.

DESCRIPTION OF EXAMPLES

EXAMPLE 1

Figure 1:
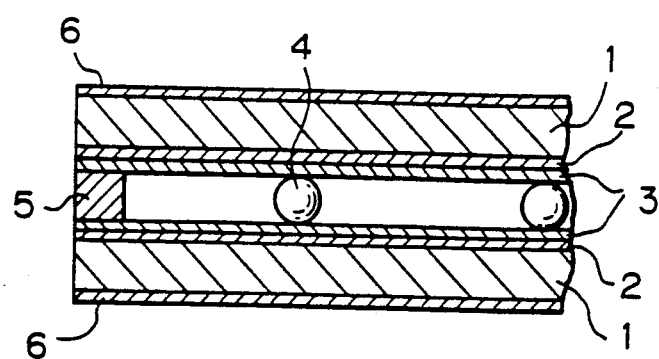
FIG. 1 is a sectional side view of a liquid crystal display produced in one Example of the present invention.

One example of the liquid crystal display in accordance with the present invention i shown in FIG. 1 in which two transparent substrates 1 are spaced apart by spacers 4. One surface of each substrate 1 near the spacers 4 is accompanied with a transparent electrode 2 and an alumina alignment layer (alignment film) 3. The space between the two substrates 1 is scaled by a sealing member 5. The other surface of each substrate 1 remote from the spacers 4 is covered with a polarized film (polarizer) 6. The above-described space sealed by the sealing member 5 is filled with liquid crystal of anisotropic, negative dielectric constant.

Figure 2:
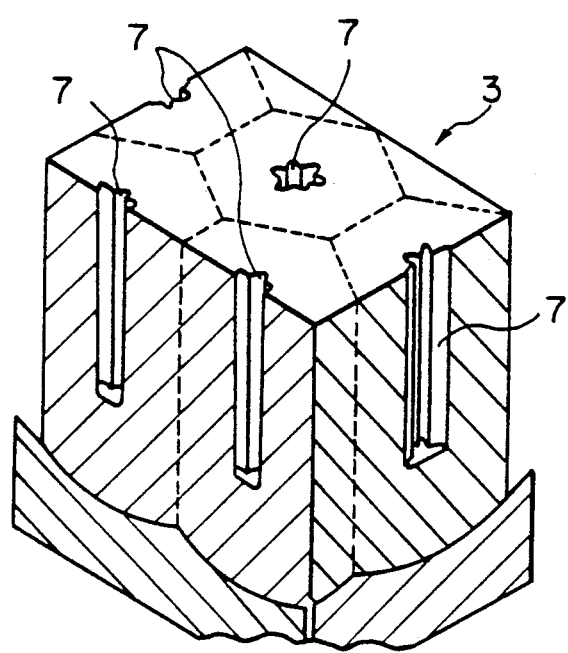
FIG. 2 is a sectional perspective view of the display shown in FIG. 1.

The thickness of the alumina alignment film is 100 nm. As shown in FIG. 2 in a magnified illustration, the alumina alignment film 3 is provided with numerous fine pores 7. The diameter of the pore is 1.2 nm, the pitch between adjacent pores 7 is 25 nm and the depth of the pore is 80 nm. The cell thickness of the display is 10 82 m.

In production of such a liquid crystal display, an Al layer of 100 nm thickness was formed by evaporation process on a glass subsrtate of high smoothness and accompanied with a transparent electrode made of In-Sn oxide and the Al layer was subjected to anodic oxidation. The anodic oxidation was carried out at 5 V voltage, with 200 A current, at 25° C. bath temperature and for 1 min. Next, silica type spacers 4 were deposited on one of two substrates 1 and, after printing of a bond in a prescribed pattern, the two substrates 1 were combined together to form a liquid crystal cell. The cell was sealed with an epoxy type bond after infusion of liquid crystal.

Persence of vertical orientation of liquid crystal molecules in a dark field of vision was confirmed by microscopic observation (using crossed polarizer type microscope) of this liquid crystal display. Good reproduction and stability of molecular orientation was also confirmed after production of a plurality of displays.

EXAMPLE 2

A ferroelectric type liquid crystal display of 2.0 μm was produced in which the alignment film 3 was subjected to rubbing process. In the rubbing process, an anode oxidized Al layer was rubbed with a cotton cloth.

The pretilt angle of this display was 45 degrees in the N* phase (cholesterol phase). In addition, the display was provided with uniform state of molecular orientation. Measurement was applied to the display to investigate the voltage-transmittance relationship. When a pulse of +10 V height and 1 msec length was applied, the transmittance was 25%, i.e. quite clear. Even when the voltage was lowered to zero after the pulse application, there was no change in transmittance and molecular orientation of liquid crystal, subsequently, a pulse of −10 V was applied. The resultant field of vision was dark. It was confirmed by this test that the display had a function of a memory too.

EXAMPLE 3

An alumina layer was subjected to rubbing process and liquid crystal composition containing a chiral substance was infused into a cell to form a STN type liquid crystal component. The resultant pretilt angle was 30 degrees. The display was also provided with good reproduction and stability of molecular orientation.

We claim:

1. A liquid crystal display comprising:
   a substrate;
   an electrode layer; and
   an alignment layer given in the form of a porous alumina layer;
   a liquid crystal layer, said substrate, electrode layer, liquid crystal layer and alignment layer being coupled to one another to form a liquid crystal display.

2. A liquid crystal display as claimed in claim 1 in which
   said alignment layer is subjected to rubbing process during its production.

3. A liquid crystal display as claimed in claim 1 in which
   the thickness of said alignment layer is in a range from 5 nm to 5 μm.

4. A liquid crystal display as claimed in claim 1 in which said porous alumina layer has pores formed therein and the diameter of said pores is in a range from 10 to several ten nm.

5. A liquid crystal display as claimed in claim 2 in which the thickness of said alignment layer is in a range from 5 nm to 5 μm.

6. A liquid crystal display as claimed in claim 2 in which said porous alumina layer has pores formed therein and the diameter of said pores

* * * * *